(12) United States Patent
Wolfe et al.

(10) Patent No.: US 9,189,448 B2
(45) Date of Patent: Nov. 17, 2015

(54) ROUTING IMAGE DATA ACROSS ON-CHIP NETWORKS

(75) Inventors: Andrew Wolfe, Los Gatos, CA (US);
Tom Conte, Atlanta, GA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1332 days.

(21) Appl. No.: 12/545,063

(22) Filed: Aug. 20, 2009

(65) Prior Publication Data

US 2011/0047351 A1 Feb. 24, 2011

(51) Int. Cl.
*G06F 15/173* (2006.01)

(52) U.S. Cl.
CPC ................................. *G06F 15/17381* (2013.01)

(58) Field of Classification Search
CPC ............................ G06T 1/20; G06F 15/17381
See application file for complete search history.

(56) References Cited

U.S. PATENT DOCUMENTS

| 2009/0201302 A1* | 8/2009 | Hoover et al. | 345/502 |
| 2009/0231348 A1* | 9/2009 | Mejdrich et al. | 345/506 |
| 2010/0239186 A1* | 9/2010 | Fowler et al. | 382/291 |
| 2011/0013836 A1* | 1/2011 | Gefen et al. | 382/171 |

* cited by examiner

*Primary Examiner* — Maurice L McDowell, Jr.
(74) *Attorney, Agent, or Firm* — Ren-Sheng International

(57) ABSTRACT

A network of switches may be adapted to route image data to one or more processor cores based on tags associated with data samples, where each tag includes at least one reference-space coordinate value. When image data is received by the network, the image data may be spatially transformed to a reference space, e.g., the physical space that is represented by the image data, to generate the data samples and each data sample may be tagged with a corresponding reference space coordinate value and routed through the network to one or more of the processors according to the tag.

17 Claims, 5 Drawing Sheets

ROUTING IMAGE DATA ACROSS ON-CHIP NETWORKS

BACKGROUND

Unless otherwise indicated herein, the approaches described in this section are not prior art to the claims in this application and are not admitted to be prior art by inclusion in this section.

Computational physical simulation and animation play an important and useful role in a range of computer applications, including virtual reality, electronic and computer games, scientific simulations, and robotic motion planning. Game developers, for example, increasingly use real-time, physics-based animation to enhance the realism of game-object interactivity. Despite the considerable efforts devoted to accelerating video and other image-based data processing, displaying and processing state-of-the-art computer simulation and animation requires a level of computational resources that, in many cases, exceed capabilities of available computing power. The present disclosure contemplates that further improvements in the efficiency of computational physical simulation are desirable as described herein.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

In the drawings.

DETAILED DESCRIPTION

Figure 1:
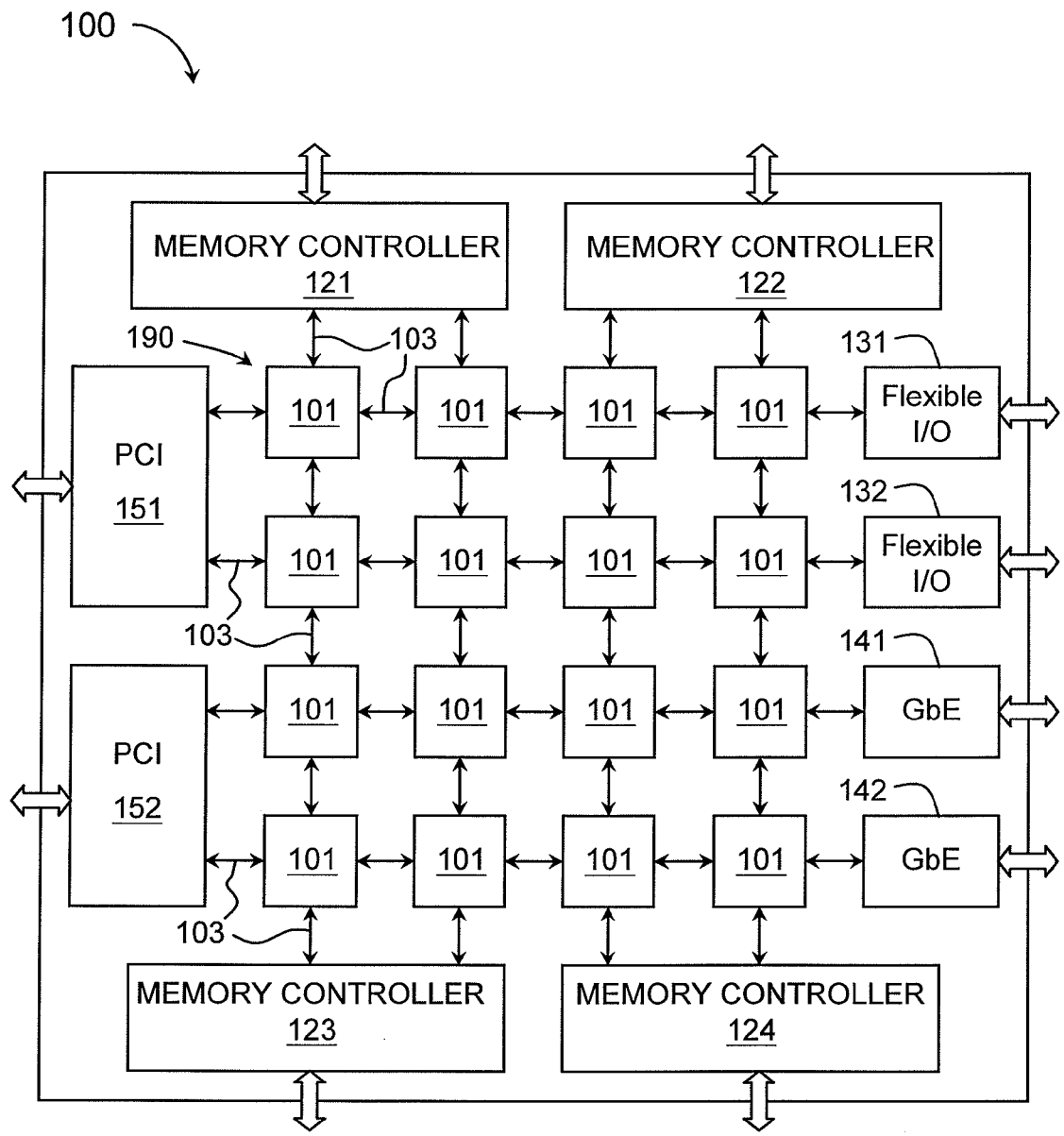
FIG. 1 is a block diagram of a multi-core chip.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to apparatus, methods, computer programs, and systems related to the field of computer graphics and, more specifically, to routing image data, e.g., computational photography data, across on-chip networks.

Some embodiments of the present disclosure contemplate methods of assigning data processing tasks in an on-chip network. Data related to an image in camera space may be spatially transformed to reference space, also referred to as "physical," space. Each data sample making up the reference space image may be tagged with corresponding reference space coordinate values and "self-routed" through the on-chip network to the requisite processing element according to its tag. As a result, data samples may be assigned to the different processors in the on-chip network based on the reference space coordinate values for each data sample.

FIG. 1 is a block diagram of a multi-core chip 100 arranged in accordance with at least some embodiments of the present disclosure. Multi-core chip 100, which may also be referred to as a network-on-chip (NOC), may be a multi-core processor capable of thread-level parallel processing, in which each execution core may execute a completely separate thread of code. This can mean one thread may run from an application and a second thread may run from an operating system, for example, or parallel threads may run from within a single application. Applications written to take advantage of the multi-core architecture may run much faster than if run on a single core, such as may be the result for 2D and 3D graphics modeling applications. However, routing of data to the multiple cores may still be a time-consuming operation, since a program may be required to specifically move each datum to the correct core or each processor may be required to fetch each datum from a shared memory. Embodiments of the present disclosure may provide a more efficient method of routing computational photographic data to the multiple cores of multi-core chip 100.

Multi-core chip 100 may include a plurality of processing cores 101 arranged in a mesh network 190, as shown, and connected to each other and other components of multi-core chip 100 with shared buses 103. The number of processing cores 101 included in mesh network 190 may be very large, e.g., 32, 64, or more. Multi-core chip 100 may also include on-chip memory, controlled by memory controllers 121-124, and a variety of input-output (I/O) controllers, including flexible I/O interfaces 131, 132, and gigabit Ethernet (GbE) interfaces 141, 142. On-chip memory may include one or more varieties of random access memory (RAM), such as dynamic RAM (DRAM), static RAM (SRAM), synchronous DRAM (SDRAM), double data rate SDRAM (DDR SDRAM), etc. Memory controllers 121-124 act as memory interfaces for such on-chip memory. Flexible I/O interfaces 131,132 can be software-configured to handle a number of protocols. Multi-core chip 100 may further include one or more peripheral bus interfaces, such as peripheral component interfaces (PCI) expansion interfaces 151, 152.

Figure 2:
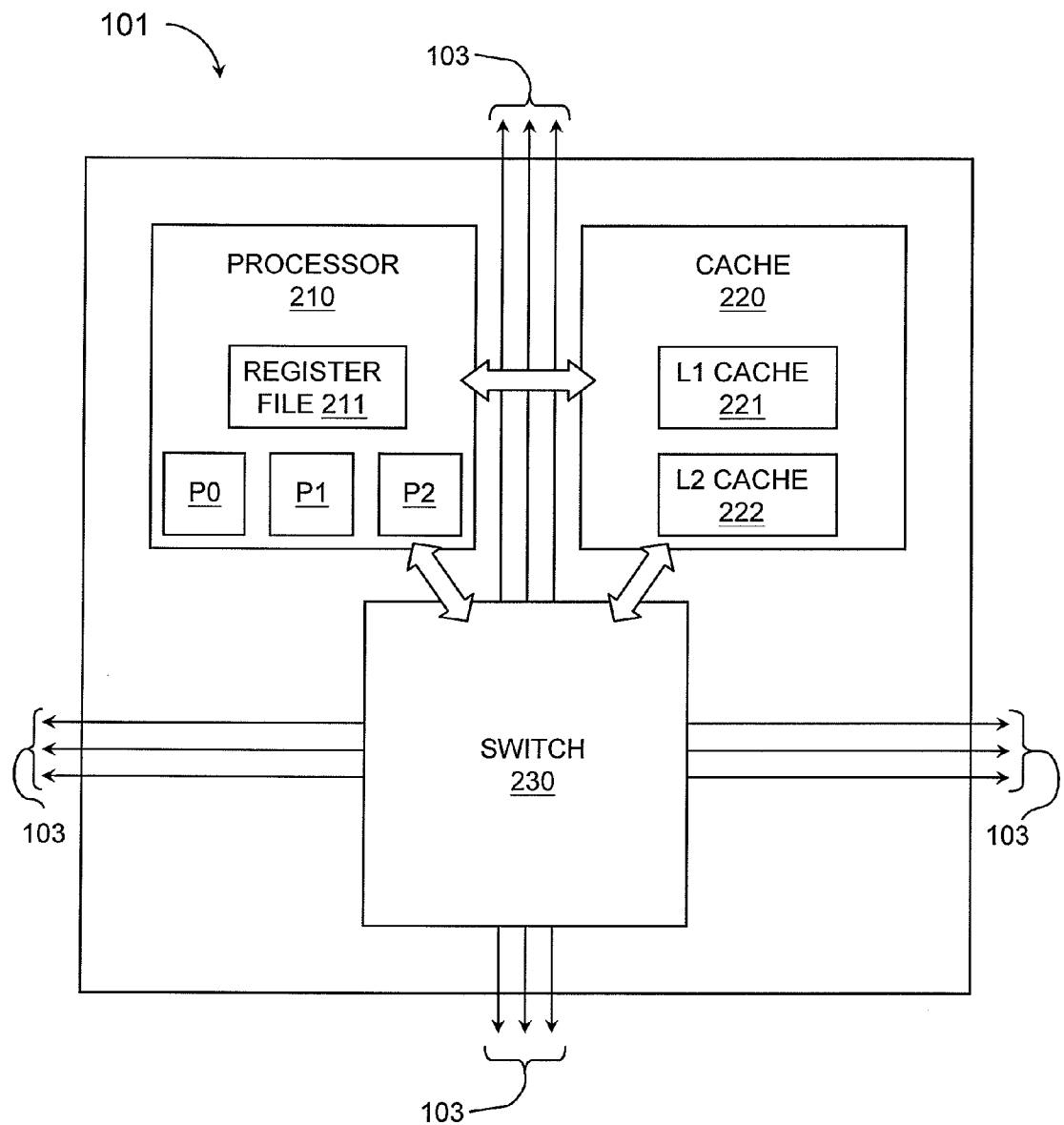
FIG. 2 schematically illustrates one of the processing cores that make up a multi-core chip.

FIG. 2 schematically illustrates one of the processing cores 101 that make up multi-core chip 100, arranged according to at least some embodiments of the present disclosure. Processing core 101 may include a general-purpose processor 210, a cache 220, and/or a switch 230. Processor 210 may include a register file 211 and three functional units such as, for example: integer arithmetic logic units P0 and P1, and/or a load-store unit P2. Cache 220 may include an L1 cache, an L2 cache, and/or an overall virtual L3 cache (not shown). Switch 230 may serve as a non-blocking router, which processing core 101 may use to communicate with the other processing cores 101 on multi-core chip 100. In some embodiments, processing core 101 may not include switch 230. In such embodiments, a plurality of switches may be arranged in the mesh network 190 between the processing cores 101 of multi-core chip 100.

Processing core 101 may be adapted to run a full operating system independently from other processing cores 101 of multi-core chip 100. Alternatively, multiple processing cores 101 may be adapted to run a symmetrical multi-processing operating system. Similarly, processing core 101 may be adapted to run an individual application either independently of, or in conjunction with, the other processing cores 101 that make up multi-core chip 100.

Figure 3:
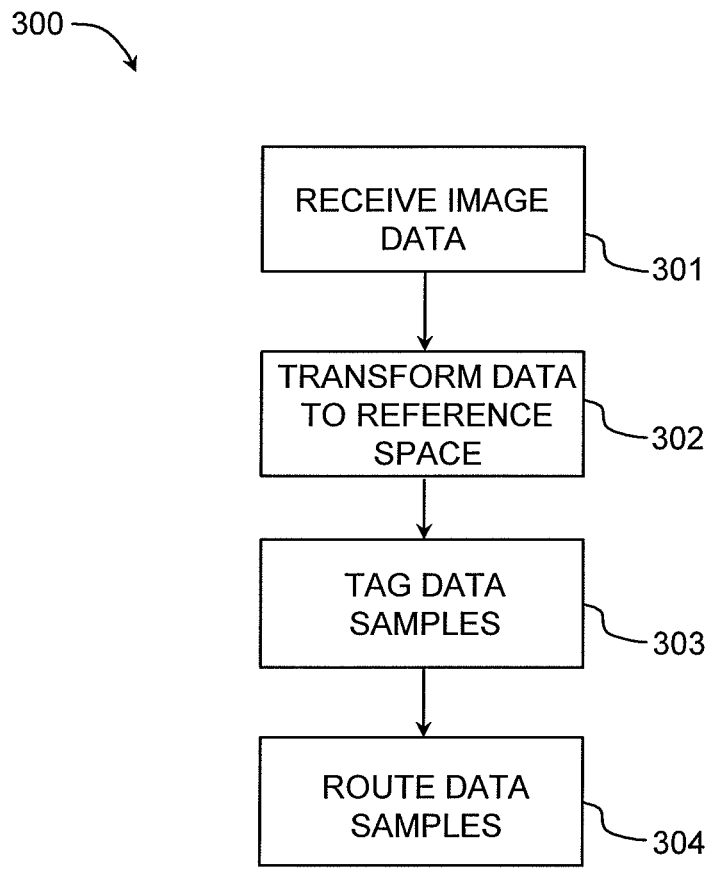
FIG. 3 sets forth a flow chart summarizing a method of assigning processing tasks for computational photography data in a multi-core grid.

FIG. 3 sets forth a flow chart summarizing a method 300 of assigning processing tasks for computational photography data in a multi-core grid, arranged according to at least some embodiments of the present disclosure. For ease of description, method 300 is described in terms of a multi-core chip substantially similar to multi-core chip 100 in FIG. 1. However, other configurations of multi-core chip may also perform method 300. Method 300 may include one or more functions, operations, or actions as depicted by blocks 301, 302, 303 and/or 304. In some implementations the various features of the illustrated blocks for method 300 may be combined into fewer blocks, divided into additional blocks, or eliminated based on the desired result. Processing for method 300 may begin at block 301.

In block 301, Receive Image Data, image data may be received for processing by multi-core chip 100. The image data may be retrieved from storage, such as a memory device, or a camera that may have captured the image data. The camera may be an actual digital camera or a virtual camera, such as that used in video simulation, e.g., in video games or other virtualization applications. An actual camera may be a single image device or a video camera device, and may be a conventional camera or incorporated into any other electronic device or mobile device, such as a mobile phone, computer peripheral, laptop computer, or other hand-held device. Block 301 may be followed by block 302.

In block 302, Transform Data to Reference Space, the received image data may be transformed from a camera space into a reference space for computation, i.e., the image data is remapped into a known set of coordinates. For example, a two-dimensional digital camera-space image may be mapped into the physical space coordinates in which the actual object, or model, may reside. In some examples, the physical-space coordinates may be based on the frame of reference of an actual (or virtual) space, such as a room, where the X-axis is parallel to one wall of the room, the Y-axis is parallel to another wall, and the Z-axis is from floor to ceiling. Such a spatial transform process may be performed by numerous methods as understood by one of skill in the art in light of the present disclosure. In some embodiments, a simple affine transform may be used. In various embodiments, the spatial transform of the image data may be performed by a separate processor that is not contained in multi-core chip 100. In some additional embodiments, one or more processing cores 101 of multi-core chip 100 are tasked to perform the spatial transform. Block 302 may be followed by block 303.

In block 303, Tag Data Samples, each data sample that makes up the reference-space image may be tagged according to the reference-space coordinates of the data sample. In some embodiments, the data tagging operation may be performed by a separate processor that is not contained in multi-core chip 100. In some other embodiments, one or more processing cores 101 may be tasked to perform the data tagging operation. Block 303 may be followed by block 304.

In block 304, Route Data Samples, each data sample may be routed to the appropriate core using a "self-routing" process, which may be based on the reference/physical space coordinates included in each tag. The self-routing process may not require a separate program to route data samples to the appropriate core, nor are the individual cores required to fetch each datum from a shared memory. Instead, each switch 230 in multi-core chip 100 may be programmed with a set of distribution rules that maps reference coordinates to processing cores 101. For example, in a simple X-Y mapping, a switch 230 may be configured to use the Y-coordinate to route a data sample as follows: the data sample may be routed upwards in the 2-dimensional array of processing cores 101 when the Y-coordinate exceeds an upper threshold value, downwards when the Y-coordinate falls below a lower threshold value, and when the Y-coordinate falls between the two thresholds, the switch 230 may be arranged to use the X-coordinate to route the data sample to the right or the left. In light of the present disclosure, it will be appreciated that the distribution of data samples that occurs in block 304 need not be a uniform distribution. An uneven distribution of data samples may be implemented in order to efficiently perform the desired data processing.

In some embodiments, method 300 may be arranged to facilitate efficient routing of data samples on a multi-core chip, thereby improving the speed of computational physical simulations.

In some embodiments, method 300 may be extended to three-dimensional models. In such embodiments, the reference-space coordinates of a three-dimensional object may be used to spatially map the processing across the array of processing cores 101 in multi-core chip 100.

In some other embodiments, a time model may be included in method 300, so that the routing of data samples may vary over time. In such embodiments, the spatial transform of block 302 may include a temporal component, i.e., the routing of data samples may be time dependent. Thus, the routing scheme for data samples need not be fixed for multi-core chip 100. For example, the data-routing algorithm of block 302 may be modified based on changes in reference space, i.e., in a simulation or the physical world, that have occurred and that have skewed the distribution of computational workload between the processing cores 101 of multi-core chip 100. In some embodiments, the data-routing algorithm of block 302 may be modified based on predicted changes in reference space.

In some other embodiments, method 300 may be extended to computational photography, where the image data from multiple cameras and/or multiple images from a single camera may be routed to the processing cores 101 of multi-core chip 100 in the manner herein described.

Figure 4:
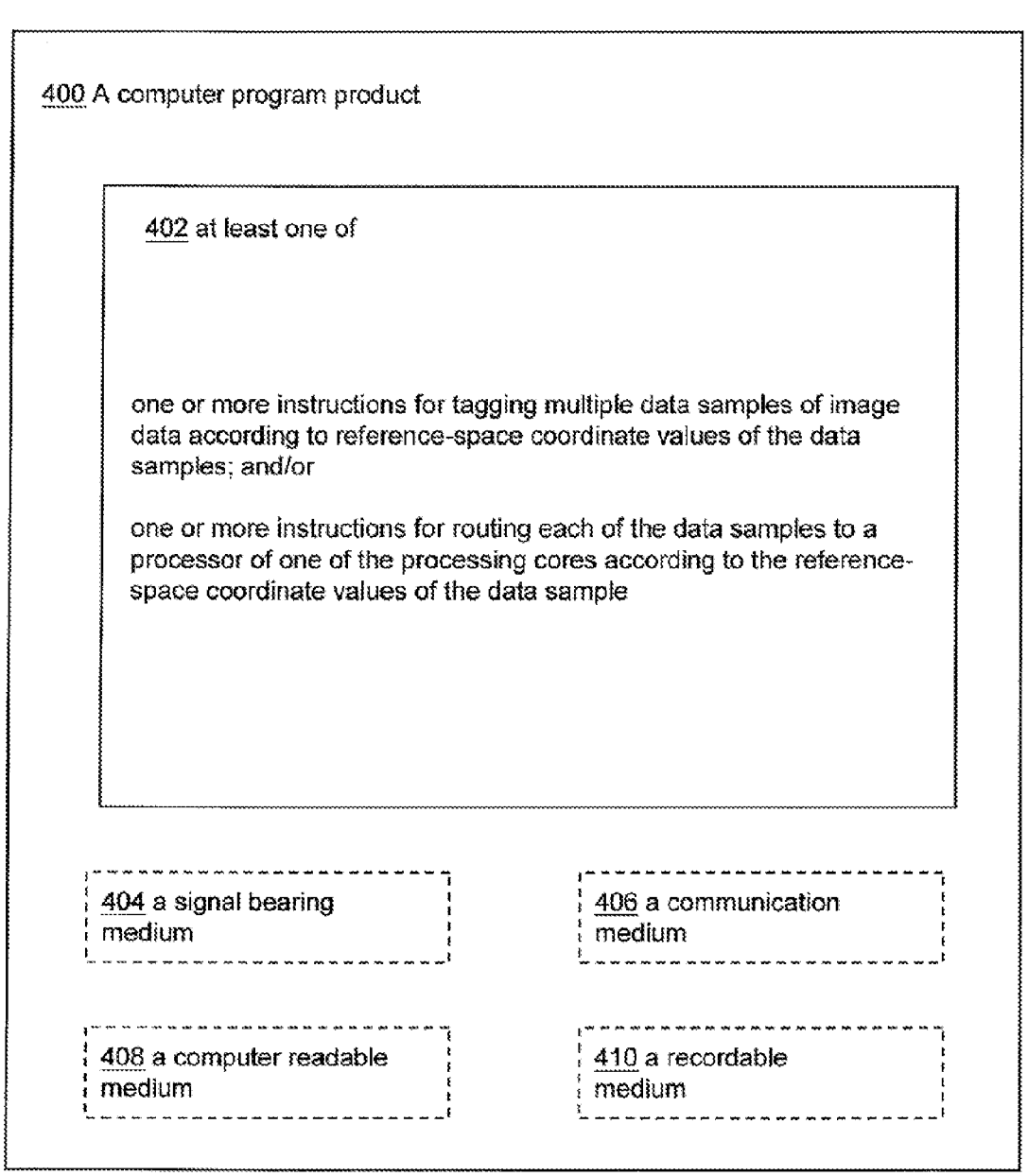
FIG. 4 is a block diagram illustrating a computer program product for routing computational photography data across on-chip networks, in accordance with at least some embodiments of the present disclosure.

FIG. 4 is a block diagram illustrating a computer program product 400 for routing computational photography data across on-chip networks, in accordance with at least some embodiments of the present disclosure. Computer program product 400 may include one or more sets of executable instructions 402 for executing methods to assign processing tasks for computational photography data in a multi-core grid. For illustration only, the instructions 402 reflect the methods described above and illustrated in FIG. 3. Computer program product 400 may be transmitted in a signal bearing medium 404 or another similar communication medium 406. Computer program product 400 may be recorded in a computer readable medium 408 or another similar recordable medium 410.

Figure 5:
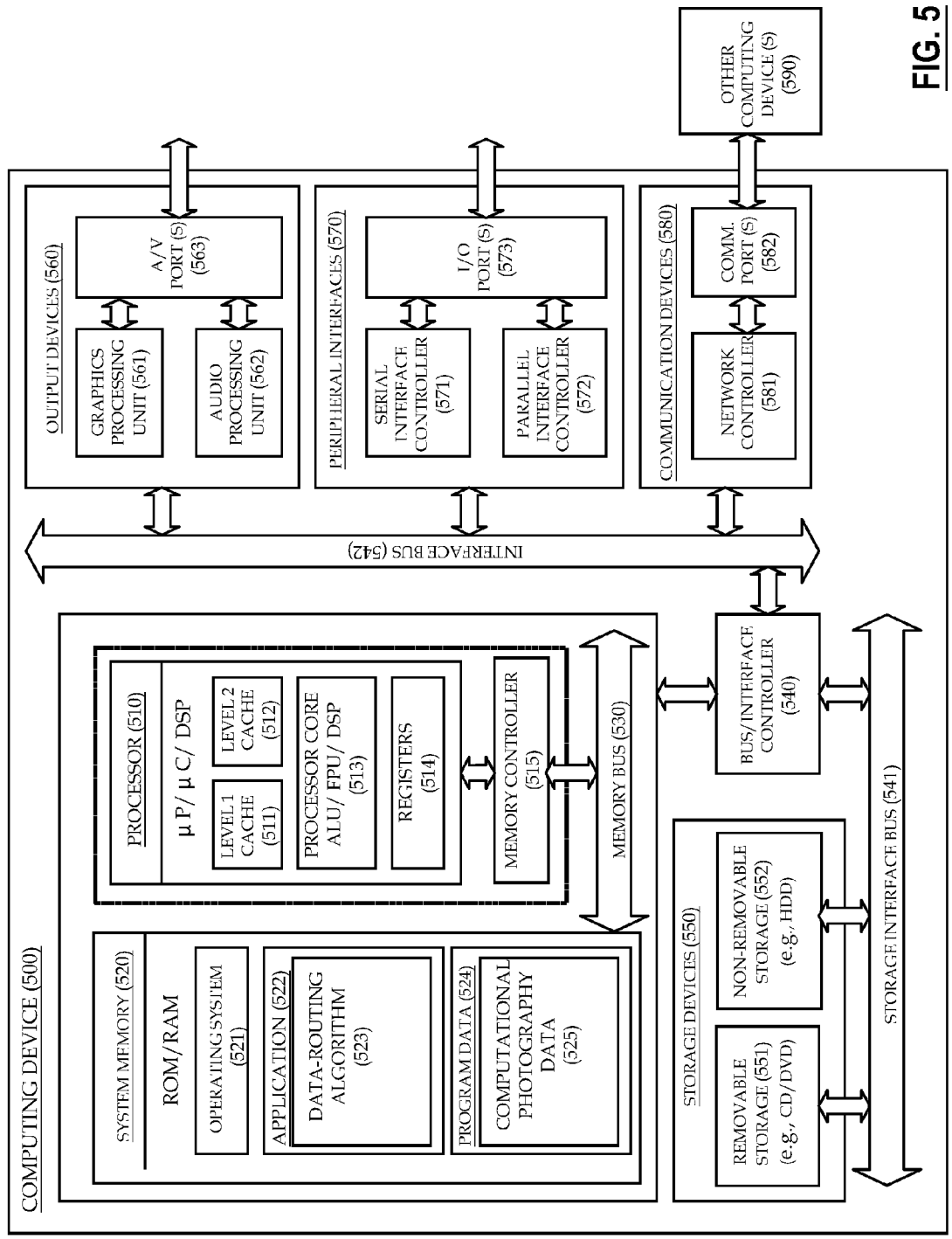
FIG. 5 is a block diagram illustrating an example computing device that is arranged for routing computational photography data across on-chip networks, all arranged in accordance with at least some embodiments of the present disclosure.

FIG. 5 is a block diagram illustrating an example computing device 500 that is arranged for routing computational photography data across on-chip networks in accordance with at least some embodiments of the present disclosure. In a very basic configuration 501, computing device 500 typically includes one or more processors 510 and system memory 520. A memory bus 530 may be used for communicating between the processor 510 and the system memory 520. In one embodiment, processor 510 is substantially similar in organization and operation to multi-core chip 100 in FIG. 1.

Depending on the desired configuration, processor 510 may be of any type including but not limited to a microprocessor (µP), a microcontroller (µC), a digital signal processor (DSP), or any combination thereof. Processor 510 may include one more levels of caching, such as a level one cache 511 and a level two cache 512, a processor core 513, and registers 514. An example processor core 513 may include an arithmetic logic unit (ALU), a floating point unit (FPU), a digital signal processing core (DSP Core), or any combination thereof. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include a data-routing algorithm 523, which may be arranged to route computational photography data across on-chip networks. Program data 524 may include computational photography data 525. In some embodiments, application 522 may be arranged to operate with program data 524 on an operating system 521. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An apparatus that is arranged to process image data, the apparatus comprising:
a plurality of processors; and
a plurality of switches arranged in a network,
wherein the network is arranged to use the switches to selectively route data samples through the network to one or more of the plurality of processors based on tags associated with the data samples, wherein each tag includes at least one reference-space coordinate value of a reference space that is spatially transformed from an image space, the data samples each represents a different portion of the reference space, and each of the plurality of processors is assigned to one or more of the different portions of the reference space, and wherein each data sample is self-routed through the network by use of a self-routing process in which the switches are programmed with a set of distribution rules that map reference-space coordinate values, contained in the tags of the data samples, to the plurality of processors, and
wherein the network is arranged to use the switches to modify routing of the data samples based on time-dependent changes, including at least one of:
predicted changes in the reference space, and
changes in the reference space that have skewed a distribution of computational workload among the plurality of processors.

2. The apparatus according to claim 1, wherein the data samples represent an image of a physical space and the at least one reference-space coordinate value includes coordinates that represent the physical space.

3. The apparatus according to claim 1, wherein the plurality of switches are configured to route each of the data samples to the processor that has been assigned to the portion of the reference space represented by the data sample.

4. The apparatus according to claim 1, wherein one of the processors is configured to transform the image data from a local space to the reference space to generate the data samples, wherein the local space is defined with respect to a device that captured the image data, and wherein the reference space is a physical space that is represented by the image data.

5. The apparatus according to claim 1, wherein each of the plurality of switches is configured to receive a data sample and route the received data sample to either one of the plurality of processors or another one of the plurality of switches according to the tag associated with the data sample.

6. The apparatus according to claim 1, wherein each of the plurality of processors is contained in a separate processor core that also includes a respective one of the plurality of switches.

7. The apparatus according to claim 1, wherein each of the processors is coupled to at least one of the plurality of switches.

8. A non-transitory computer-readable storage medium that stores instructions to be executed in a computer system with a plurality of switches arranged in a network and multiple processor cores each including a processor, wherein the instructions are executable by the computer system to route image data according to a method comprising:
tagging data samples of received image data according to reference-space coordinate values associated with the data samples, wherein the reference-space coordinate values are associated with a reference space that is spatially transformed from an image space;
routing each of the tagged data samples to one or more processors according to the reference-space coordinate values associated with the data sample through the network by use of a self-routing process in which the switches are programmed with a set of distribution rules that map the reference-space coordinate values to the one or more of the processors, wherein each data sample represents an image of a different portion of the reference space corresponding to the reference-space coordinate values and each of the processor cores is assigned to one or more different portions of the reference space; and
modifying the routing based on time-dependent changes, including at least one of:
predicted changes in the reference space, and
changes in the reference space that have skewed a distribution of computational workload between the processor cores.

9. The non-transitory computer-readable storage medium according to claim 8, wherein each of the data samples is routed to a processor of the processor core that has been assigned to the portion of the reference space represented by the data sample.

10. The non-transitory computer-readable storage medium according to claim 8, wherein the method carried out by the computer system executing the instructions further comprises transforming the received image data from a local space to the reference space to generate the data samples, wherein the local space is defined with respect to a device that captured the image data and the reference space is a physical space that is represented by the image data.

11. The non-transitory computer-readable storage medium according to claim 8, wherein tagging produces a tag for each of the data samples and wherein routing of each of the data samples is performed based on the tag.

12. The non-transitory computer-readable storage medium according to claim 8, wherein the method carried out by the computer system executing the instructions further comprises retagging the data samples after a period of time has elapsed from an initial tagging.

13. The non-transitory computer-readable storage medium according to claim 8, wherein the image data is received from a mobile device.

14. A method to route image data to be processed by one or more processor cores, each of the processor cores including a processor, the method comprising:
tagging multiple data samples of the image data according to reference-space coordinate values associated with the data samples, wherein the reference-space coordinate values are associated with a reference space that is spatially transformed from an image space;
routing each of the data samples to one or more processors according to the reference-space coordinate values associated with the data sample;
retagging the data samples after a period of time has elapsed from an initial tagging,
wherein each of the data samples represent an image of a different portion of the reference space corresponding to the reference-space coordinate values and each of the processing cores is assigned to one or more different portions of the reference space, wherein each of the processor cores is associated with a switch that is arranged to receive a data sample and route the received data sample to either another one of the processor cores or to one of the switches associated with the another one of the processor cores, and wherein each data sample is self-routed by use of a self-routing process in which the switches are programmed with a set of distribution rules that map the reference-space coordinate values of the data samples to the one or more processors; and modifying the routing based on time-dependent changes, including at least one of:

predicted changes in the reference space, and changes in the reference space that have skewed a distribution of computational workload between the processor cores.

15. The method according to claim 14, further comprising: transforming the image data from a local space to the reference space to generate the data samples, wherein the local space is defined with respect to a device that captured the image data and the reference space is a physical space that is represented by the image data.

16. The method according to claim 14, wherein tagging produces a tag for each of the data samples and wherein routing of each of the data samples is performed based on the tag.

17. The method according to claim 14, further comprising: receiving the data image from a mobile device.

* * * * *